United States Patent [19]

Thurner

[11] E Re. 31,195

[45] Reissued Apr. 5, 1983

[54] METHOD AND A DEVICE FOR ASCERTAINING THE DEGREE OF COMPACTION OF A BED OF MATERIAL WITH A VIBRATORY COMPACTING DEVICE

[76] Inventor: Heinz Thurner, Bunsövägen 29, S-132 00 Saltsjö üöü

[21] Appl. No.: 121,907

[22] Filed: Feb. 15, 1980

Related U.S. Patent Documents

Reissue of:

[64] Patent No.: 4,103,554
Issued: Aug. 1, 1978
Appl. No.: 773,783
Filed: Mar. 2, 1977

[30] Foreign Application Priority Data

Mar. 12, 1976 [SE] Sweden ..... 7603249
Aug. 3, 1976 [SE] Sweden ..... 7608709

[51] Int. Cl.[3] ..... G01M 7/00
[52] U.S. Cl. ..... 73/573
[58] Field of Search ..... 73/573, 574, 579, 84, 73/32 A; 404/133

[56] References Cited

U.S. PATENT DOCUMENTS 4,040,292 8/1977 Theurner ..... 73/84

FOREIGN PATENT DOCUMENTS 46-27219 8/1971 Japan ..... 73/32 A

OTHER PUBLICATIONS

"Statistische Verfahren zur Datenverarbeitung . . . ", Thesis by Prickhartz, published Oct. 1970.

*Primary Examiner*—James J. Gill
*Attorney, Agent, or Firm*—Birch, Stewart, Kolasch and Birch

[57] ABSTRACT

A device for ascertaining the degree of compaction of beds of material with a vibratory compaction device as a function of the vibratory amplitude of the motion of the compaction device at selected frequencies is described. The amplitude of vibratory motion of a compaction device is measured at a fundamental frequency and at least the second harmonic of the fundamental frequency and a ratio of the measured signals is computed. The ratio or quotient of the two signals provides a representation of the degree of compaction of the material being compressed by the compaction device. The ratio or quotient may be utilized either as a direct indication to an operator of the degree of compaction or as a control signal in an automated servo control compaction system.

18 Claims, 19 Drawing Figures

METHOD AND A DEVICE FOR ASCERTAINING THE DEGREE OF COMPACTION OF A BED OF MATERIAL WITH A VIBRATORY COMPACTING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method and a device for ascertaining the degree of compaction in a bed of material with a vibratory compacting device. The invention is particularly related to a method and a device for ascertaining the degree of compaction by evaluating the signals from at least one transducer which is responsive to the vibratory motion of the compacting device as well as that of the bed being compacted.

2. Description of the Prior Art

It was previously known to estimate the degree of compaction achieved with a compacting apparatus by controlling parameters such as vibratory frequency, vibratory amplitude, compaction time etc. in response to the observed degree of compaction. A serious drawback in this context is the difficulty of finding physical characteristics that are easy to measure, exhibit a significant relationship to the degree of compaction achieved and lend themselves to the control of the compacting device.

Natural physical characteristics such as soil density, soil elasticity coefficient etc. are not possible to measure continuously with simple devices. Several proposals have therefore made use of the vibratory motion of the vibratory device and/or that of the soil. By estimating the relationship between the force or the energy developed by the vibrator in the compacting device and the motion of the soil, it is possible to determine the nature of the vibratory motion resistance of the soil.

A device of the last mentioned type is disclosed in British Pat. No. 1372567 published Oct. 30, 1974. In FIGS. 17–19 and the accompanying text in accordance with this previously known device, two acceleration pick-up devices 147 sense the motion of the soil and two strain gauges 158 sense the force of a vibrator 154–156. By comparing the amplitudes of the output signals from the acceleration pick-ups 157 and from the strain gauge 158, it is possible to determine the nature of the vibratory motion resistance of the soil and the result of the comparison can be used for estimating or controlling the operation of the compacting machine.

Another prior art device of a different type for estimating the degree of compaction achieved with a vibratory device is disclosed in U.S. Pat. No. 3,599,543 issued Aug. 17, 1971 to Kerridge. The motion of a vibrating part, for example the roller, of a vibratory roller may in accordance with said U.S. Patent be approximated by an ellipse. From FIG. 1 of said U.S. Patent, it is apparent that the major axis of the ellipse will increase with an increasing number of passes to and fro over the soil. Therefore, the major axis is used as a measure of the degree of compaction. In order to determine the major axis of the ellipse, the vibratory motion of the roller is sensed by a number of accelerometers the positions and orientation of which are clearly indicated in FIGS. 2 to 4 of the said U.S. Patent.

In another prior art device disclosed in U.S. Pat. No. 3,053,157, it is suggested that the degree of compaction achieved with a dynamic soil compacting apparatus be optimized by setting the vibratory frequency at the resonance frequency of the system comprising the dynamic soil compacting apparatus and the soil. To this end, the vertical acceleration of a part of the compacting apparatus is sensed by a transducer and is controlled in response to the output signal of the transducer. However, this device does not provide for any direct measurement or estimation of the achieved degree of compaction.

SUMMARY OF THE INVENTION

Accordingly, it is a primary object of the present invention to provide a method and apparatus for accurately determining the degree of compaction of a soil bed compacted by a vibratory compaction device.

The present invention derives advantage of a quite surprising discovery, namely, that in compacting a soil bed with a vibratory compacting device a relationship exists between the achieved degree of compaction of the soil or of the bed and the amplitude of the vibratory motions of the compacting device, the amplitude of said motions occuring at frequencies that correspond to harmonics of the fundamental frequency of the vibratory motion. In accordance with the invention, the amplitudes of the harmonics as well as the amplitude of such a portion of the vibratory motion that has substantially pure fundamental frequency are derived. The said relationship will be strongly amplified when the amplitudes of the parts of the vibratory motion which correspond to harmonics of the fundamental frequency are compared to the amplitude of the part of the vibratory motion which generally corresponds to the pure fundamental frequency.

In order to be able to estimate the achieved degree of compaction, only the vertical part of the vibratory movement is of primary interest for most of the embodiments in accordance with the present invention. However, estimation of the achieved degree of compaction can, in accordance with the teachings of the present invention, form part of a system for controlling the vibratory frequency, the vibratory amplitude and/or other parameters of of a vibratory compacting device. Primarily in such applications of the invention parts of or all of the horizontal component of the vibratory motion are (is) of primary interest.

BRIEF DESCRIPTION OF THE DRAWINGS

Specific embodiments of the invention will now be described by way of example with reference to the Figures of the accompanying drawings wherein elements which are not essential for the understanding of the invention have been omitted for the sake of clarity and in which:

FIGS. 11 and 12 are electrical circuit diagrams of the divider shown in FIG. 10;

DETAILED DESCRIPTION OF PREFERRED EMBODIMENTS

Figure 1:
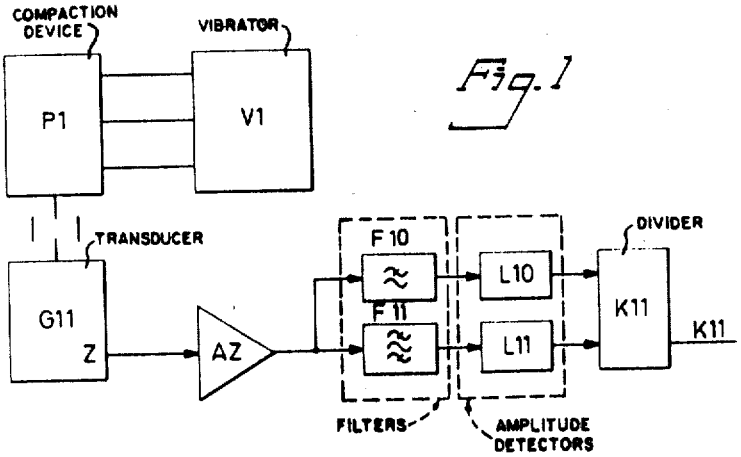
FIG. 1 is a block diagram of an embodiment of the present invention in accordance with which signals are derived by filtering and use is made of signals having frequencies which correspond to the fundamental frequency and to the second harmonic of the vibratory motion of the compactor device.

In FIG. 1, P1 represents a part of a vibratory compaction device for compacting a bed of material which may for example comprise soil, gravel, stone resulting from blasting operations, asphalt etc. Part P1 contacts the soil and is imparted a vibratory motion from a vibrator V1 of the vibratory compaction device. Vibrator V1 may comprise a mass which is rotating around an axis and has its center of gravity positioned eccentric in relation to said axis. For the sake of simplicity, it is supposed that said motion has a certain fundamental frequency, FG, although it is within the scope of the present invention that said motion may comprise several components of mutual different fundamental frequencies.

The vibratory motion of part P1 is not only related to the motion of the vibrator but also to the properties of the soil. Accordingly, when the properties of the soil are changed as a result of compaction, the vibratory motion of part P1 will change.

As indicated in FIG. 1, transducer G11 is arranged for sensing the vibratory motion during compaction of the soil. In order to illustrate the connection between the transducer and part P1, said elements are shown to be connected with each other by way of three broken parallel lines. Transducer G11 is so constructed that is responds to movements directed substantially only in one direction and it is so mounted on the vibratory compaction device that it is sensing substantially the vertical component of the vibratory motion. It is then possible to derive from the transducer output signals representative of said component and which herein will be referred to as a motion component signal. Said motion component signal is indicated by the output of the transducer and is supplied to an amplifier AZ which amplifies said signal to a proper level before it is further supplied to two band pass filters F10, F11. Amplifier AZ also acts as an impedance transducer.

The upper band pass filter F10 shown in FIG. 1 is so tuned that its passband lies around the fundamental frequency, whereas signals having frequencies substantially lower than the fundamental frequency as well as signals having frequencies above or substantially at the second harmonic of the fundamental frequency, are rejected. Therefore, the upper band pass filter can filter out the fundamental component from the motion component signal and this filtered fundamental component has a frequency that generally corresponds to that of the fundamental frequency.

The lower band pass filter F11 of FIG. 1 is so tuned that its passband lies around the second harmonic of the fundamental frequency, whereas signals having frequencies that substantially correspond to the fundamental as well as signals corresponding to the third harmonic of the fundamental, are rejected. Therefore, the lower band pass filter can filter out harmonics of the motion component signal, said filtered harmonics having a frequency that generally corresponds to the second harmonic of the fundamental. As will become more apparent hereinafter, the existence of such harmonic components are substantiated by FIGS. 14–19 and the accompanying specification.

The output signal from the upper band pass filter F10, that is the above mentioned fundamental component, is supplied to amplitude determining means L10. The output signal from said amplitude determining means represents the amplitude of the fundamental component.

The output signal from the lower band pass filter F11, that is the harmonic component, is supplied to amplitude determining means L11. Amplitude determining means L11 generates an output signal representing the amplitude of the harmonic component.

The output signal from amplitude determining means L10 and L11 are supplied to a divider K11 which generates an output signal k11 representing the quotient of the amplitude of the harmonic component and that of the fundamental. Output signal k11 may either be supplied to a display unit (not shown) observed by the operator of the compacting device or to a control device (not shown) for controlling one or more parameters of the compacting device.

In addition to the fundamental component, only one harmonic is filtered out from the motion component signal in the embodiment shown in FIG. 1.

In certain applications, a better result may be achieved if more than one harmonic component is filtered out.

The use of only one transducer as indicated in the embodiment described in connection with FIG. 1 may under certain circumstances have associated difficulties. It may be difficult to position the transducer so that the motion component signal therefrom will have optimum significance. Quite often, the position of the transducer will be slightly eccentric or asymmetric in relation to vital parts of compactor part P1. In certain circumstances, these drawbacks or problems may at least partially be compensated by the use of two transducers for sensing the vibratory movement of compactor part P1. The position of the transducers are preferably so selected that the transducers are placed symmetrically in relation to compactor part P1 or vital parts thereof.

Figure 2:
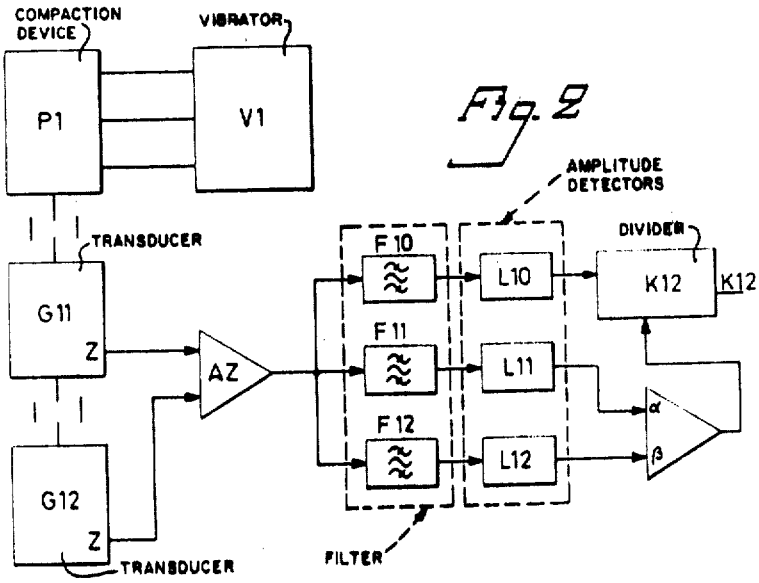
FIG. 2 is a block diagram of an embodiment of the present invention using filtering techniques for deriving signals having frequencies which correspond to the fundamental frequency and the second and third harmonics of the vibratory motion of the compactor device.

In FIG. 2, there is shown an embodiment wherein two transducers are used and wherein the amplitude of two filtered harmonic components of mutually different frequencies also are used. From each transducer, a motion component signal representing substantially the vertical component of the movement of each respective transducer is derived. The two motion component signals are added together and amplified in a preamplifier AZ. The output signal from the preamplifier is supplied to three band pass filters F10, F11, F12 the uppermost and the middle of which are constructed and operated in the same manner as that described in connection with the embodiment shown in FIG. 1.

The lowermost band pass filter F12 of FIG. 2 is so tuned that its passband is lying around the third harmonic of the fundamental, while signals having a frequency above or generally coinciding with the fourth harmonic of the fundamental as well as signals having a frequency below or a frequency generally coinciding with the second harmonic of the fundamental, are rejected. This band pass filter F12 can, therefore, filter out a harmonic component of the motion component signal, said filtered harmonic component having a frequency that generally coincides with the third harmonic of the fundamental. This filtered harmonic component is fed to amplitude determining means L12.

The output signals from amplitude determining means L11 and L12 are supplied to a weighting and adding amplifier SA which forms an output signal that represents a weighted sum of the amplitudes of filtered harmonic components. In order to illustrate that the signals are weighted when summed in the adder, the two inputs of the amplifier are marked $\alpha$ and $\beta$, respectively. The output signal from the amplifier as well as the output signal from amplitude determining means L10 are supplied to a divider K12 which generally operates in the same manner as divider K11 in the embodiment shown in FIG. 1.

The output signal from divider K12 is accordingly representative of the quotient between the weighted sum of the amplitude of the filtered harmonic components and the amplitude of the filtered fundamental component.

Figure 3:
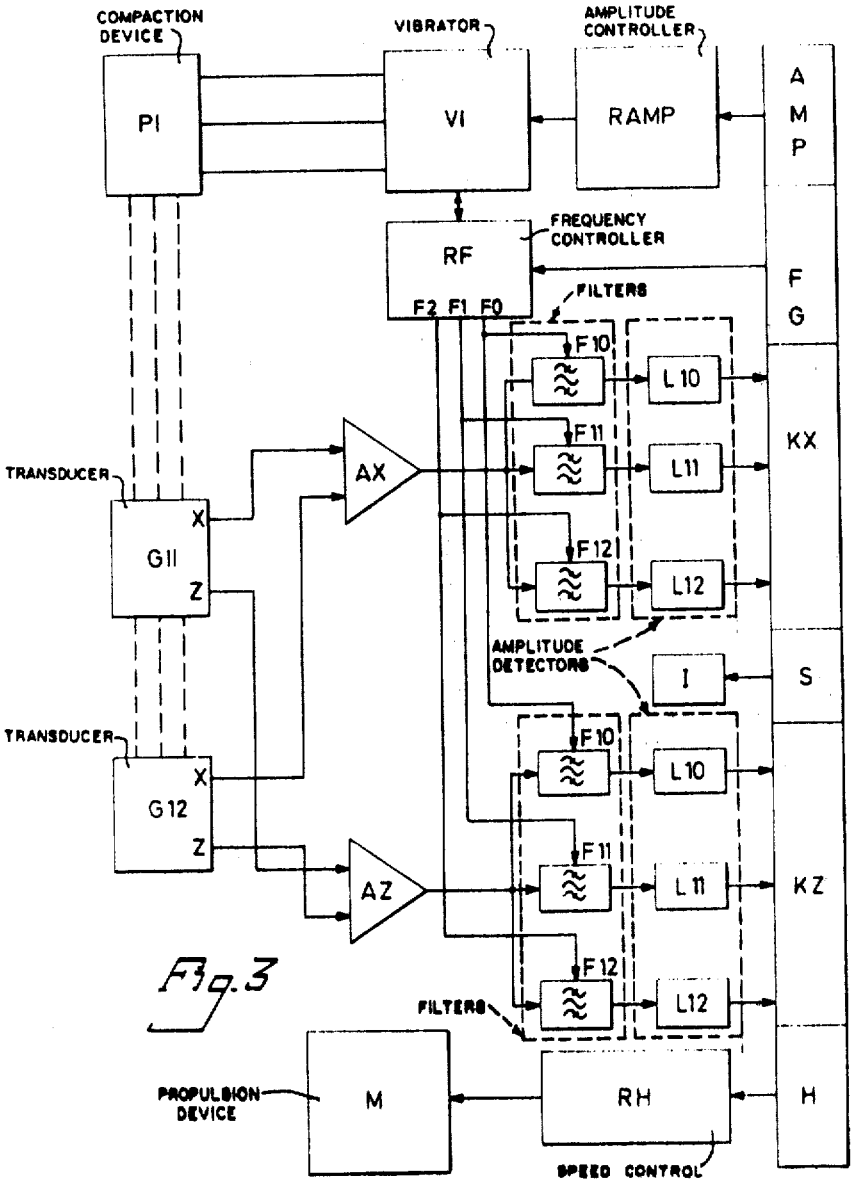
FIG. 3 is a block diagram of the present invention when implemented into a system for controlling parameters of a vibratory compacting apparatus.

The embodiments described thus far make use of motion component signals representing substantially the vertical component of the motion of one or more transducers. However, transducers from which a motion component signal representing generally a horizontal component of motion may be derived, are also within the scope of the present invention. Transducers of this kind are preferably used in controlling the compacting device when it is necessary to derive more information concerni..g the degree of compaction than can be derived with only one motion component signal that represents generally the vertical component of the motion of one or more transducers. In FIG. 3, an embodiment of this kind is depicted.

In FIG. 3, there is shown two transducers G11 and G12 each having two outputs marked X and Z respectively. A motion component signal representing generally the vertical component of the motion of the transducer is provided at output Z in a manner analogous to that of FIGS. 1 and 2. At output X on each respective transducer a motion component signal is derived which for each respective transducer represents the horizontal component of the motion of the respective transducer in a particular direction, namely, the X direction. The output signal from the Z-outputs at the transducers are processed by preamplifier AZ, by the three lower band pass filters shown in FIG. 3 as well as by the three lower rectifiers L10, L11 and L12 in the same manner as described in connection with FIG. 2. The output signal from the X-outputs of the transducers are supplied to a preamplifier AX. The output signal from preamplifier AX are processed by the three upper band pass filters indicated in FIG. 3 as well as by the three upper rectifiers L10, L11 and L12 in the same manner the output signal from preamplifier AZ of FIG. 2 is processed.

The oblong block to the extreme right of FIG. 3 symbolizes a device which on the basis of the amplitudes of the filtered fundamentals and harmonics generates signals for ascertaining and controlling the degree of compaction. In order to illustrate the various operations performed by this device, it may be thought of as being divided into six sections indicated in the drawing as AMP, FG, KX, S, ZS and H, respectively. Section KZ provides one or more signals in response to the amplitude of the signals which have been filtered by the three lowermost band pass filters in FIG. 3. Section KX provides one or more signals in response to the amplitude of the signals which have been filtered by the three uppermost band pass filters of FIG. 3. One or more of the signals provided by sections KX and KZ may for example be of the same type of signal k12 provided in the embodiment shown in FIG. 2.

Section AMP provides a signal for controlling the vibratory amplitude of the compacting device in response to one or more signals from section KX and/or section KZ. The output signal from section AMP is supplied to a control circuit RAMP controlling the vibratory amplitude of vibrator V1 in response to said output signal as well as other existing information, if any.

In response to one or more signals from section KX and/or section KZ, section H generates a signal which is supplied to a control circuit RH controlling the speed by which the compacting device is advanced. In response to this signal and other existing information, if any, control circuit RH controls a propulsion device M of the compacting device or of a vehicle drawing the compacting device. Section S provides a combination of the signals from sections KX and KZ to give an output 1.

In response to one or more signals from section KX and/or KZ, section FG generates a frequency control signal which is supplied to a frequency control circuit RF. This circuit is controlling the frequency of vibrator V1 in the response to the frequency control signal and other signals, if any, received by the frequency control circuit from vibrator V1.

In the above described embodiments, the vibratory frequency of the vibrator has been generally constant. Due to this it is possible to tune the band pass filters once for all. If optimum results of the compacting is desired, it may be required to vary the fundamental frequency of the vibrator within a comparatively wide range and in doing so it may be necessary to use band pass filters the band pass range of which can be varied at the same rate with which the fundamental frequency of the vibratory motions varies. To this end, a frequency control circuit RF is provided having transducers for sensing the vibratory motion of the vibrator. Frequency control circuit RF is also provided with three outputs labelled F0, F1 and F2. The output signals from these outputs are representative of the fundamental frequency, the second and the third harmonic, respectively, of the vibratory motion. The outputs are supplied to the band pass filters to vary their pass bands in response to variations in the fundamental frequency.

FIG. 3 and the accompanying description thereof should not be regarded as an exhaustive description of a complete system for controlling parameters of a vibratory compacting device. The invention of FIG. 3 and the accompanying text is instead to illustrate the manner in which the device in accordance with the invention may form a part of such a system, namely, the part required to make it possible to ascertain the degree of compaction. The operation of the rest of the control system does not form part of the present invention and will therefore not be described.

Tests conducted with a prototype in accordance with FIG. 1 proved successful when using it in a vibratory roller machine having a vibrating roller. However, results achieved when using it on one vibratory roller machine having two vibrating rollers turned out to be inconsistent, namely, sometimes good and sometimes less successful. One reason for this is supposed to reside in the fact that vibratory motions appearing in the soil as a result of the vibratory motion of one of the rollers interfere with other vibratory motions of the soil resulting from the vibratory motions of the second roller.

Another reason for this may be that the chassis of the vibratory roller machine provides a mutual interaction between the vibratory motions of the rollers. At present, it is therefore supposed that the embodiments according to FIGS. 1-3 are most suited to be used in compacting devices that do not have two or more at least partially independent parts P which are imparted a vibratory motion.

Figure 4:
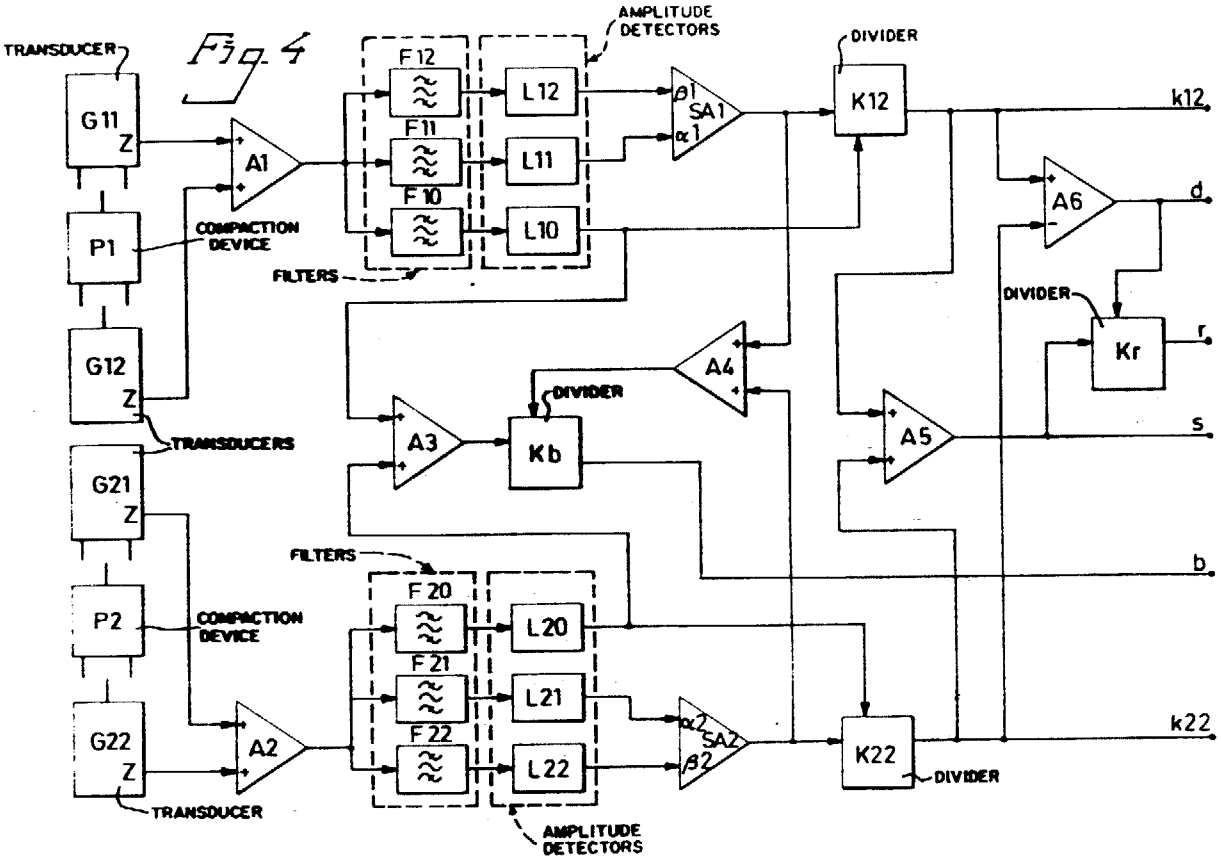
FIG. 4 is a block diagram of an embodiment of the present invention adapted especially for use in vibratory roller machines having two vibrating rollers.

The block diagram shown in FIG. 4 illustrates one embodiment of the present invention which is especially adapted for vibratory roller machines having two rollers. To a certain extent, the embodiment shown in FIG. 4 is also adapted for other compacting devices having two parts P1 and P2 which are imparted at least partially independent vibratory motions of the same or of different frequencies. The vibratory motions of part P1 is sensed by transducers G11 and G12. These transducers are so constructed and mounted that they operate in the same manner as the corresponding transducers shown in FIG. 2. The output signals from transducers G11 and G12 are added and amplified in means A1. The output signal from means A1 is processed by three band pass filters F10, F11, F12, three amplitude determining means L10, L11, L12, a weighing and adding amplifier SA1 and a divider K12 in the same manner as in the embodiment shown in FIG. 2. Output signal k12 from means K12 is accordingly representative of the quotient between the weighted sum of the filtered amplitudes of the harmonic components and the amplitude of the filtered fundamental components.

The vibratory motion of part P2 is sensed by transducers G21 and G22. These transducers are so constructed and mounted that they operate in the same manner as transducers G11 and G12 in the embodiment shown in FIG. 2. The output signals from transducers G21 and G22 are added and amplified in means A2. The output signal from means A2 is processed by three band pass filters F20, F21, F22, three amplitude determining means L20, L21 and L22, a weighting and adding amplifier SA2 and means K22 in same way in which the output signal from means AZ is processed in the embodiment shown in FIG. 2, as well as the way in which output signal from means A1 is processed in the embodiment in FIG. 4. Output signal k22 from means K22 is accordingly representative of the quotient between the weighted sum of the amplitude of the filtered harmonic components and the amplitude of the filtered fundamental component.

The output signals from amplitude determining means L10 and L20 are supplied to an adding device A3 the output signal of which is supplied to means Kb. The output signals from the weighting and adding amplifiers are supplied to adding means A4 the output signals of which are supplied to means Kb. Means Kb is of the same type as means K12 or K22 and generates an output signal which is representative of the quotient between two parameters; the first one being the weighted sum of the four filtered amplitudes of the harmonic components, the weighting coefficients being $\alpha 1$, $\beta 1$, $\alpha 2$ and $\beta 2$; the second parameter being the sum of the amplitude of the filtered fundamental components. Output signal b from means Kb will accordingly be representative of the relation between the said last mentioned weighted sum and said sum of the amplitudes of the fundamental components.

Output signal k12 from means K12 and output signal k22 from means K22 is supplied to adding means A5 which is of the same general type as adding means A3 and A4 as well as to subtracting means A6. Output signal s from adding means A5 will accordingly be representative of the sum of k12 and k22 whereas output signal d from subtracting means A6 will be representative of the difference of k12 and k22. Output signals d and s are supplied to means KR which is of the general type as means Kb. The output signal from Kr will accordingly be representative of the quotient between the difference of k12 and k22 and the sum of k12 and K22.

If the embodiment shown in FIG. 4 is used in for example a double roller compacting machine for compacting asphalt, parameter r would be indicative of the relative rate of the degree of compacting during the passage in question. The increase of this parameter r in consequence of a passage of the machine will empirically decrease with an increasing number of passes over the material being compacted. When the increase of the degree of compaction is sufficiently small in relation to the total degree of compaction, one knows that the achieved degree of compaction is near the maximum one that can be achieved if the existing conditions remain unchanged.

With a reasonable knowledge of the increase of the degree of compaction in relation to the number of passes, parameter r in combination with signal k12 and/or k22 will provide a measure of the absolute degree of compaction, though each of k12 and k22 only is indicative of a relative measure of the degree of compaction provided by P1 and P2, respectively, during the pass in question.

It is obvious to the man skilled in the art that several modifications of the embodiment shown in FIG. 4 are within the scope of the present invention. One or more of parameters b, d, s, r may for example be omitted.

Figure 5:
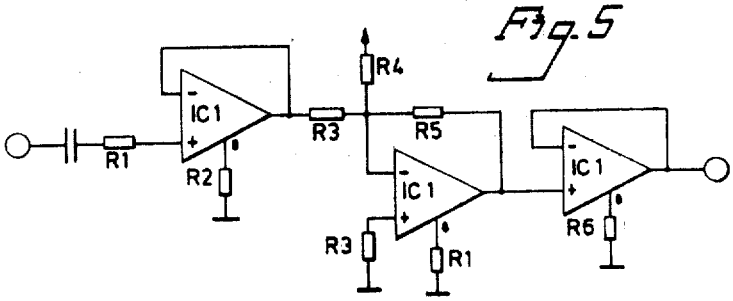
FIG. 5 is a circuit diagram of a preamplifier which may be used as for example amplifier AZ in FIG. 1.

A prototype of an indicator of the degree of compaction achieved by a vibratory roller has been manufactured in accordance with the embodiment shown in FIG. 1. As transducer G11 for sensing the vibratory motion an accelerometer of type 4393 manufactured by Bruel & Kjaer was used. The output of the accelerometer, that is signal AZ in FIG. 1, was amplified in a preamplifier the circuit diagram of which is shown in FIG. 5. The preamplifier comprises three integrated circuits ICl, manufactured by Fairchild and being of type μA776, a coupling capacitor having a capacitance of 0,1μF, two resistors R1 having a resistance of 1 MΩ, one resistor R2 having a resistance of 10MΩ, two resistors R3 each having a resistance of 10kΩ, one resistor R4 connected to a voltage source not shown, one resistor R5 having a resistance of 10kΩ and one resistor R6 of 470kΩ. The reference designation 8 indicated at each integrated circuit refers to the corresponding terminal of the package as indicated on the manufacturer's data sheet.

Figure 6:
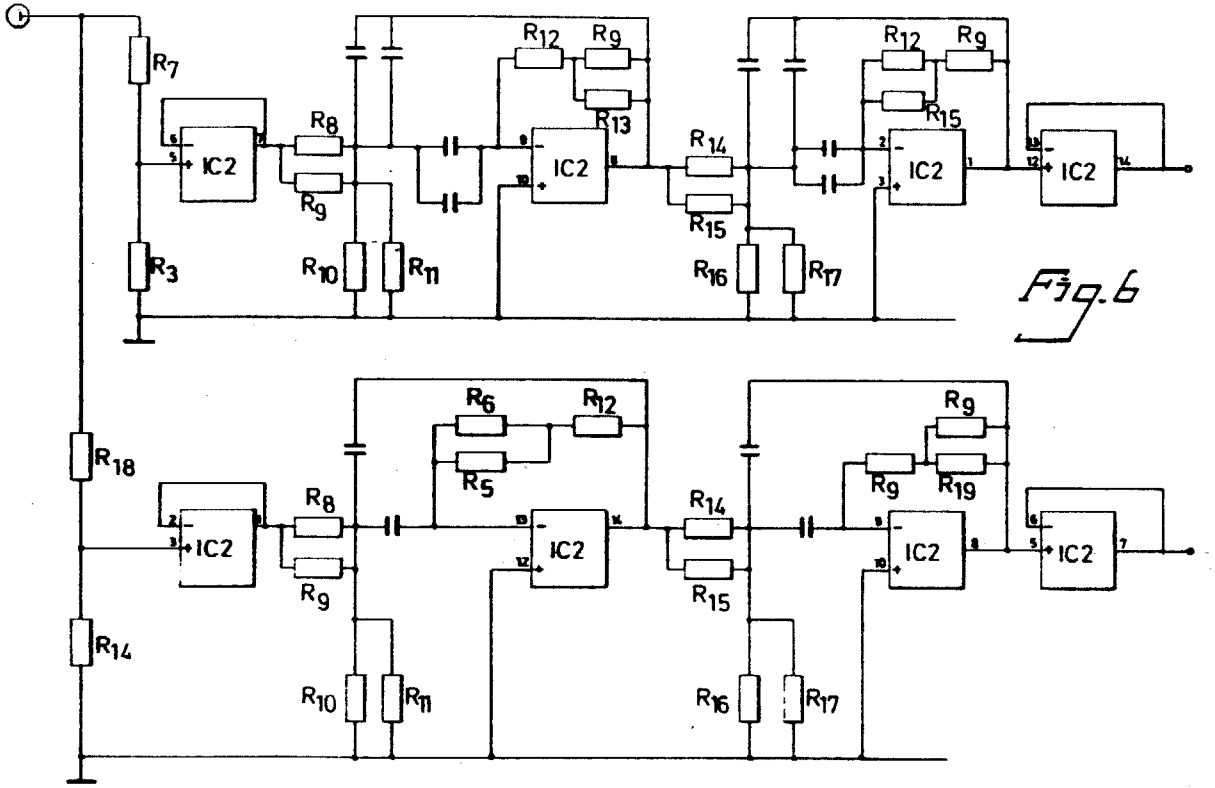
FIG. 6 is a circuit diagram of a fundamental and harmonic filter which may be used in the embodiment shown in FIG. 1.

In FIG. 6, the circuit diagram of two band pass filters used in the prototype in accordance with the embodiment of FIG. 1 is indicated. The upper portion of the circuit diagram is a band pass filter having a pass band lying around 25 Hz. The lower portion of the circuit diagram of FIG. 6 refers to a band pass filter of the same general kind but having a pass band lying around 50 Hz. The relative band width of the band pass filters has deliberately been made as identical as possible and is about ⅓.

A vibratory roller manufactured by Dynapac and having the model number CH 47 was used and the fundamental frequency thereof was about 25 Hz. The upper and lower portion of the circuit diagram of FIG. 6 correspond to the upper and the lower band pass filters F10, F11, respectively, of FIG. 1.

Each filter of FIG. 6 is built around an integrated circuit having four separate operational amplifiers IC2 in the same package and being manufactured by Motorola under the name MC 3403 P. The upper filter which has a pass band lying around 25 Hz comprises eight capacitors the capacitances of which are 100 nF each while the lower filter which has its passband round 50 Hz comprises four capacitors each having a capacitance of 100 nF. Besides a voltage source, not shown, each filter comprises a number of resistors R7-R19 having the following resistances: $R_7$=89 kΩ, $R_8$=47 kΩ, $R_9$=150 kΩ, $R_{10}$=4,7 kΩ, $R_{11}$=22 kΩ, $R_{12}$=470 kΩ, $R_{13}$=120 kΩ, $R_{14}$=33 kΩ, $R_{15}$=220 kΩ, $R_{16}$=3,9 kΩ, $R_{17}$=15 kΩ, $R_{18}$=66 kΩoch $R_{19}$=560 kΩ.

Figure 7:
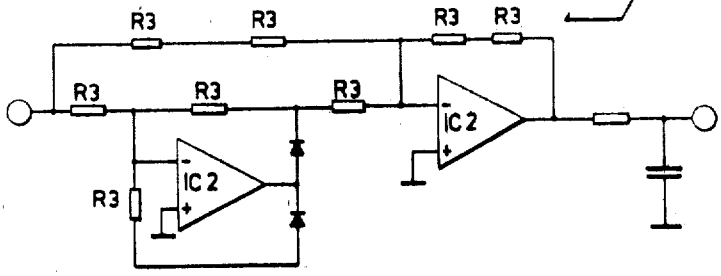
FIG. 7 is a circuit diagram of a rectifier and a low pass filter which are used together as amplitude sensing means L10 or L11 in the embodiment shown in FIG. 1.

Reference is now made to FIG. 7 showing a circuit diagram of a rectifier which is followed by a low pass filter. The combination indicated in FIG. 7 has been used as amplitude determining means L10 in the prototype built in accordance with the embodiment of FIG. 1. The rectifier comprises an integrated circuit sold by Motorola under the trade name MC 3403 P. This integrated circuit comprises four separate operational amplifiers but only two thereof are used in the rectifier. The two remaining operational amplifiers in the package are used for amplitude determining means L11. The rectifyin, operation is performed by two diodes connected over the output of the left operational amplifier. In addition to a voltage source, not shown, the rectifier comprises eight resistors each of 10kΩ. The low pass filter comprises a simple RC-combination with a resistor R of 1,2 kΩ and a capacitor C of 1000 μF.

Figure 8:
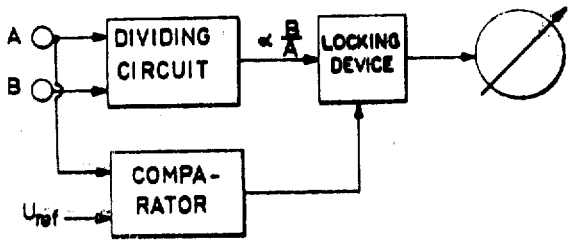
FIGS. 8 and 9 are a block diagram and circuit diagram, respectively, of a divider used in connection with an analogue signal processing technique, for example used as K11 in the embodiment shown in FIG. 1.

Reference is now made to FIG. 8 showing a block diagram of a divider used as divider K11 in the prototype built in accordance with the embodiment of FIG. 1. The divider has two inputs A and B, respectively, for receiving output signals from the lower pass filter shown in FIG. 7. Input B is receiving the output signal of the rectifier and low pass filter combination used for sensing the amplitude of the filtered harmonic component, that is the combination corresponding to L11 of FIG. 1. Input A is receiving the output signal from the rectifier and low pass filter combination used for sensing the amplitude of the filtered fundamental component, that is the combination corresponding to L10 of FIG. 1. The divider operates with analogue signal processing techniques and comprises a dividing circuit which delivers an output signal the magnitude of which is proportional to the quotient between the magnitude of the input signal on input B and the magnitude of the input signal on input A.

The quotient between the amplitude of the filtered fundamental component is of course relevant only in case the amplitude of the fundamental component is higher than the noise or background level. To this end the block diagram of FIG. 8 comprises a comparator and a locking device the operation of which correspond to that of a squelch control provided in a common tuner. In the comparator, the amplitude of the filtered fundamental components is compared with a predetermined reference amplitude ref and as a result of the comparison a signal is supplied to the locking device. In response to said signal, the locking device will pass the output signal from the divider to the display only in case the input signal at input A, that is the amplitude of the filtered fundamental component, is sufficiently high.

Figure 9:
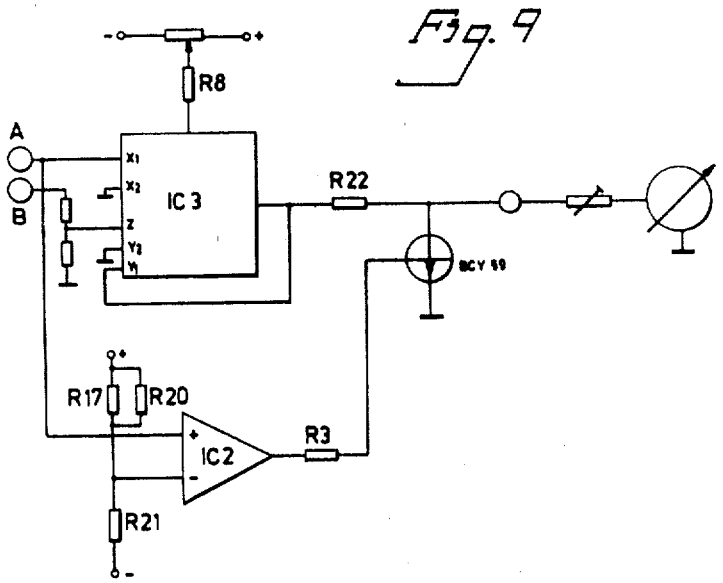

Reference is now made to FIG. 9 showing the circuit diagram of a divider provided with a comparator and a locking device in accordance with the block diagram of FIG. 8 and used as divider K11 in the prototype manufactured in accordance with the embodiment of FIG. 1.

The divider is built around two integrated circuits. One of these, viz. IC2, is of the same type as that used in the filters and in the rectifier. Circuit IC2 compares the input signal at input A with a voltage which is tapped from a voltage divider comprising resistors the resistance of which are 15kΩ, 68kΩ and 12kΩ, respectively, and generates and output signal which via a resistor of 10kΩ is supplied to the base of a transistor which is manufactured by ITT under the trade name of BY Y 59. Accordingly, IC2, the resistors and the transistor will form the comparator and the locking device shown in the block diagram of FIG. 8.

The second integrated circuit IC3 is manufactured by Analog Devices and is sold under the trade name AD532. This IC is so wired that it provides an output signal the magnitude of which is proportional to the input signal at input B divided by the input signal at input A. The output signal from the integrated circuit IC3 is, via a resistor R22 of 2.2kΩ and a variable resistor, connected to an indicator which provides a visual indication when the transistor is in its nonconducting state due to the existence of a signal from IC2. When the transistor is in its saturated state in response to a signal from IC2, the output signal from IC3 will be shunted to earth via a resistor of 2.2kΩ.

Figure 10:
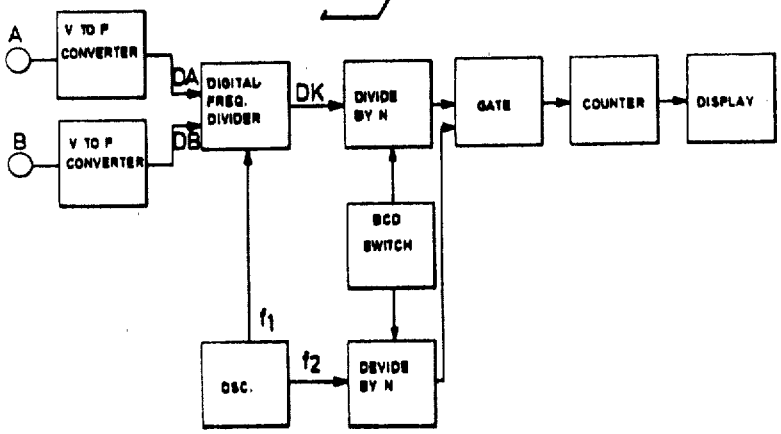
FIG. 10 is a block diagram of a divider used in connection with a digital signal processing technique and as an averager for deriving the mean value over any selected interval, said averager being used as K11 in FIG. 1.

The divider described thus far operates with analogue signal processing techniques. However, it is of course possible to use a divider having digital signal processing techniques. In FIG. 10, a block diagram of a divider of the last mentioned type is shown.

Input A of the divider is supplied with the output signal from amplitude determining means L10 to which the filtered fundamental component is supplied. Input B of the divider is supplied either with the output signal from amplitude determining means L11 to which the filtered harmonic component is supplied or with the output signal from the weighting and adding amplifier with FIGS. 2 and 4.

A first voltage-to-frequency converter generates a first digital output signal DA in the form of pulses, the repetition frequency of which is dependent on the magnitude of the input signal to input A. A second voltage-to-frequency converter generates a second ditital output signal DB in the form of pulses, the pulse repetition frequency of which is dependent on the input signal to input B. The first and second output signal as well as a signal having a frequency $f_1$ from an oscillator are supplied to a digital divider which is generating a third digital output signal DK in the form of pulses the pulse repetition frequency of which is dependent on the quotient between the amplitude of the input signal at input B and the input signal at input A. The third digital output signal is supplied to a frequency divider dividing by a factor N, where N is settable with the aid of a BCD switch which also is controlling the corresponding factor N of a second divider-by-N similar to the first mentioned divider. The second divider-by-N is supplied with a signal having a frequency $f_2$ from the oscillator and is generating in response thereto a logic signal which is supplied to a gate. In response to said logic signal, the gate will either block or pass to a counter the digital output signal which is appearing in the form of pulses and emanates from the first divider-by-N.

The logic signal from the second divider-by-N will shift its logic level at time intervals which are proportional to N. Accordingly, the gate will pass digital pulses from the first divider-by-N during time intervals which are proportional to N. On the other hand, the frequency of the digital pulses are inversely proportional to N in consequence of the first divider-by-N. Accordingly, the number of pulses supplied to the counter is substantially independent of N provided the existing conditions remain unchanged. From the above, it is clear that the instantaneous pulse repetition frequency of DK will be substantially proportional to the quotient between the magnitude of the signal applied at input B and the magnitude of the signal applied at input A. The count of the counter will, however, be substantially proportional to a mean value of this quotient taken during a time interval which is settable and also proportional to N.

Figure 11:
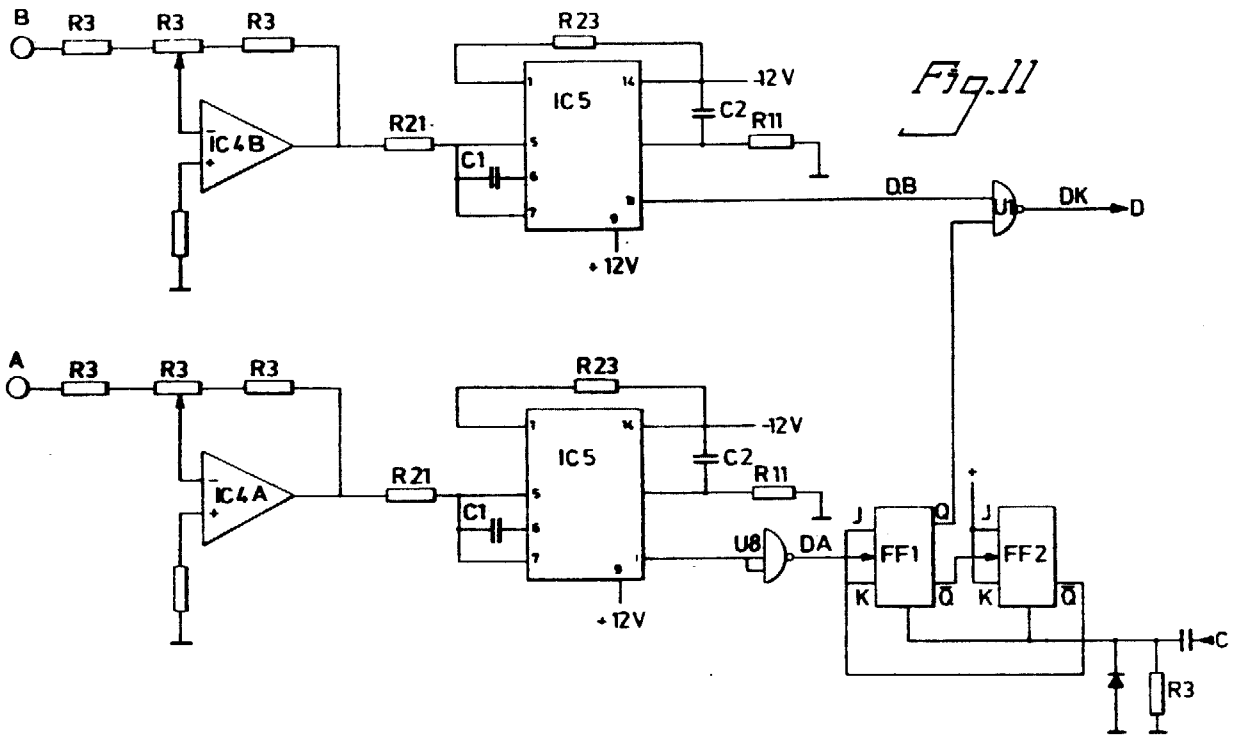

In FIGS. 11 and 12, there is shown a circuit diagram of a digital divider provided with an averager of the type shown in FIG. 10.

The analogue input signals to inputs A and B are inverted and amplified to a suitable level by way of two operational amplifiers IC4A, IC4B manufactured by Fairchild and sold under the trade name μA 741. The output signals of the operation amplifiers are each supplied to a voltage-to-frequency converter. Each voltage-to-frequency converter IC5A, IC5B comprises an integrated circuit manufactured by Intech and sold under the trade name A-8400. The two integrated circuits are implemented with electrical components the individual values of which differ between the two integrated circuits so that the pulse repetition frequency of the first digital output signal DA varies between 50 and 100 Hz while the pulse repetition frequency of the second digital output signal DB varies between about 0.5 and 50 kHz.

The digitally performed division of the frequencies of the pulse trains is performed on the basis of and is controlled by a pulse train having a constant frequency $f_1$ derived from an oscillator provided with a frequency divider. The oscillator comprises an integrated circuit manufactured by RCA under the trade designation CD 4060. The oscillator frequency is 3276, 8 Hz and this frequency divided by $2^6$ resulting in an $f_1$ equal to 51, 2 H and also by $2^{14}$ resulting in an $f_2$ equal to 0,2 Hz.

The positive flank at input C provides via a capacitor of 100 pF and a resistor 10kΩ a reset pulse to the JK flip-flops which are manufactured by RCA under the trade name CD 4027. The diode is used to shunt negative pulses to earth. The first one of the pulses DA which occurs after the reset pulse will after inversion in an inverter trigger a first JK flip-flop FF1. When JK flip-flop FF1 is triggered, gate U1 will open and pass pulses from DB. When the next pulse of DA arrives, the first flip-flop FF1 will again change its state, close gate U1 and also change the state of a second flip-flop FF2.

The $\overline{Q}$ terminal of flip-flop FF2 will then go low and will prevent; in consequence of the wiring of the J and K inputs of flip-flop FF1; that FF1 will be triggered by succeeding pulses on DA. Flip-flops FF1 and FF2 are sold by Fairchild under the trade designation CD 4027.

Accordingly, gate U1 will pass pulses from DB during one period of DA once during each period of frequency $f_1$.

Pulse train DK comprises bursts of pulses the frequency of which within the bursts is the same as the frequency of DB. One burst will be provided during each period of frequency $f_1$ and will have a duration which is as long as a period of DA. The number of pulses during one second is:

$$f_1 \cdot \frac{\frac{1}{f_A}}{\frac{1}{f_B}} = f_1 \cdot \frac{f_B}{f_A} - \text{konst} \cdot \frac{f_B}{f_A}$$

This frequency is divided by 256 in a counter which is manufactured by RCA and has the trade name CD 4520 thereby providing a pulse train having a suitable frequency and pulses that are generally uniformly distributed in time. The circuit comprises switches that provide for manual selection between a single measurement and indication of a mean value or a continuous measurement and indication of successive mean values during successive time intervals.

When the START button is depressed and the two movable contacts of the mode switch are in the left position shown in the drawing, the monostable flip-flop IC7 (RAC type CD 4098) will be triggered and deliver a reset pulse at output Q for resetting the three decade counters CD 4518, a pulse to a flip-flop formed by gates U2 and U3 which will go low and thereby provide a low level at input R of oscillator IC6 which will begin to oscillate, as well as a pulse which via OR-gates U6 and U7 is supplied at the $\overline{PL}$ inputs of counters IC8 (RCA type CD 40192). Upon receipt of said pulse, counters IC8 are set at a count N previously set at BCD.

Inputs LE of three drivers CD 4511 (RCA CD 4511) have low level in consequence of gates U4 and U5. Therefore, the counting up of the decade counters CD 4518 will be continuously displayed at the display which comprises modules having the type designation FND 500. NAND gates U1–U5 and U8 as well as OR gates U6 and U7 are manufactured by RCA under the designation CD 4011 and CD 4071, respectively. The capacitance of the capacitors connected to IC6 and IC7 is 15nF and 150nF, respectively.

In response to incoming pulses of DK at input D and pulses having the frequency $f_2$ from oscillator IC6, the counters IC8 will start counting down from N. When a count of zero is reached they will generate a pulse at each respective output $TC_D$. The pulse at the output of the upper counter will pass through OR gate U7 to input $\overline{PL}$ of the upper counter to reset the upper counter to a count of N again. In the same manner, the pulse at output $TC_D$ of the lower counter will pass through OR gate U6 and set the lower counter at a count of N. Moreover, the pulse at output $TC_D$ will reset the flip-flop constituted by U2 and U3. This will occur after $N/f_2$ seconds and will stop oscillator IC6. The counts then appearing in decade counters CD 4518, that is the result of the performed measurement, will be presented at the display.

In the continuous measuring and indicating mode, the movable contacts of mode switch are in right position and the above described operation sequence is started. However, the counting up of the counters will not be displayed since LE will now go high because the switch will now connect one input of U4 to a positive potential.

When the first measurement is completed after $N/f_2$ seconds, U9 will deliver a $TC_D$ pulse which will bring one of the inputs of U4 down to a low level and accordingly bring LE to go down implying that the counts of the decade counters will be passed and displayed. Said $TC_D$ pulse will also trigger the monostable flip-flop whereafter the next sequence will start in the same manner as were the START button depressed.

Accordingly, the last measurement taken will be presented at the display until a new value has been measured.

Figure 13:
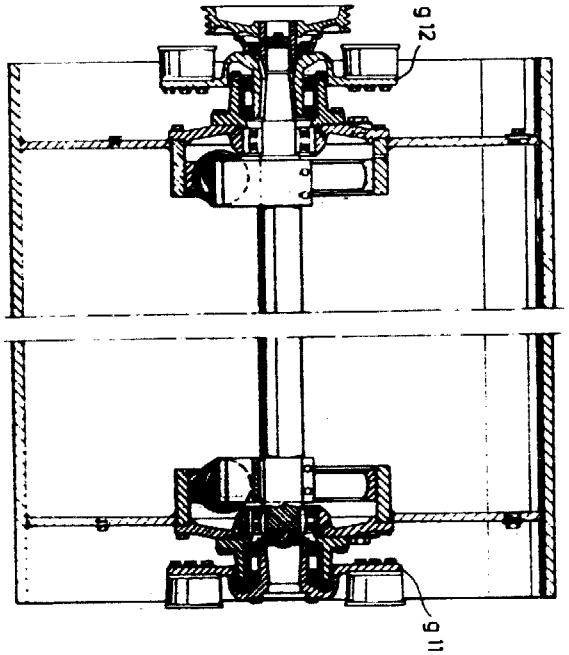
FIG. 13 illustrates the positioning of a transducer on a vibratory roller machine.

As mentioned previously, the prototype has been tested on a vibratory roller manufactured by Dynapac under the trade designation CH 47. In order to illustrate the mounting of the transducers, FIG. 13 illustrates a cross section of the roller and adjacent elements thereof. The transducer was mounted at g11. Concerning the rest of the elements shown in FIG. 13, reference is made to the manufacturer's instruction manual describing model CH 47. The manual may upon request be supplied by the manufacturer. In this context, it is worthwhile to note that the position of the transducer is similar to the position of transducer T shown in FIG. 2 of U.S. Pat. No. 3,599,453.

If the above indicated roller CH 47 is to be provided with two transducers in accordance with for example the embodiment shown in FIG. 2 of the drawings, the second transducer may for example be mounted at g12 as indicated in FIG. 13.

Figure 14:
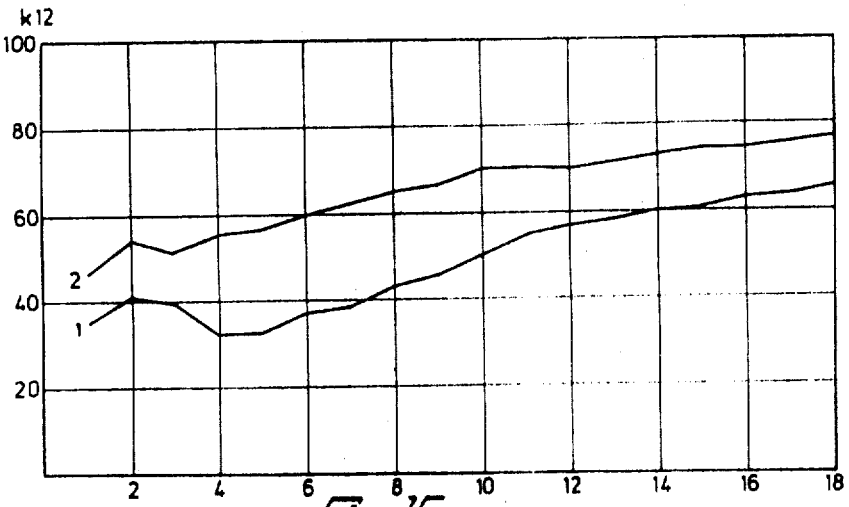
Figure 15:
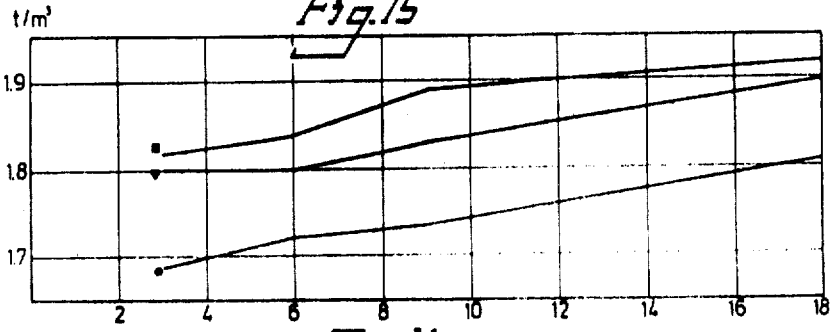
Figure 16:
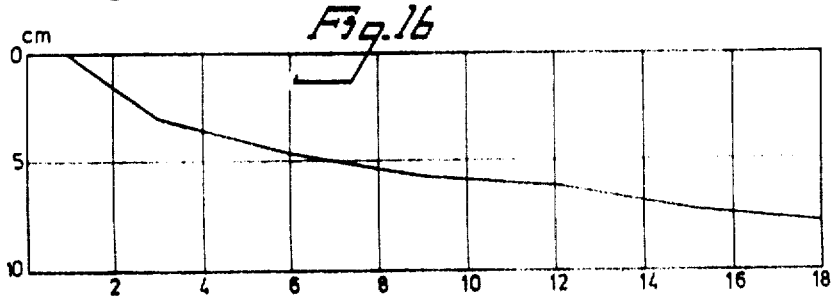

In FIGS. 14–16, the results of two tests performed with the above mentioned single roller vibratory machine CH 47 on sand are illustrated. These tests were conducted in Karlskrona in 1976.

The te.:s were conducted on a sand bed which was 1.5 meters high and was provided between plinths which were used as a ground for a hall construction. Due to the rather high and loose filling, the bed ruptured after 3–4 passages which is indicated by the curve representing test No. 1. The bed was thereafter loosened down to about 60 cm with the aid of a caterpillar and test No. 2 was then conducted.

In FIG. 14, the relative magnitude of the quotient between the amplitude of the second harmonic and that of the fundamental is shown as a function of the number of passages (1–18) over the bed. The results have been derived by analysing tape recordings of the signal achieved with the constructed prototype.

In FIG. 15, the result of density measurements taken after passages Nos. 3, 6, 9 and 18 during test No. 1 is shown. The density has been measured at three different levels (● = 1–15 cm; ■ = 15–30 cm; ▼ = 30–40 cm) with the aid of a water volume meter.

In FIG. 16, the settlement of the bed surface is shown as a function of the number of passages. The settlement was measured by surface levelling.

Figure 19:
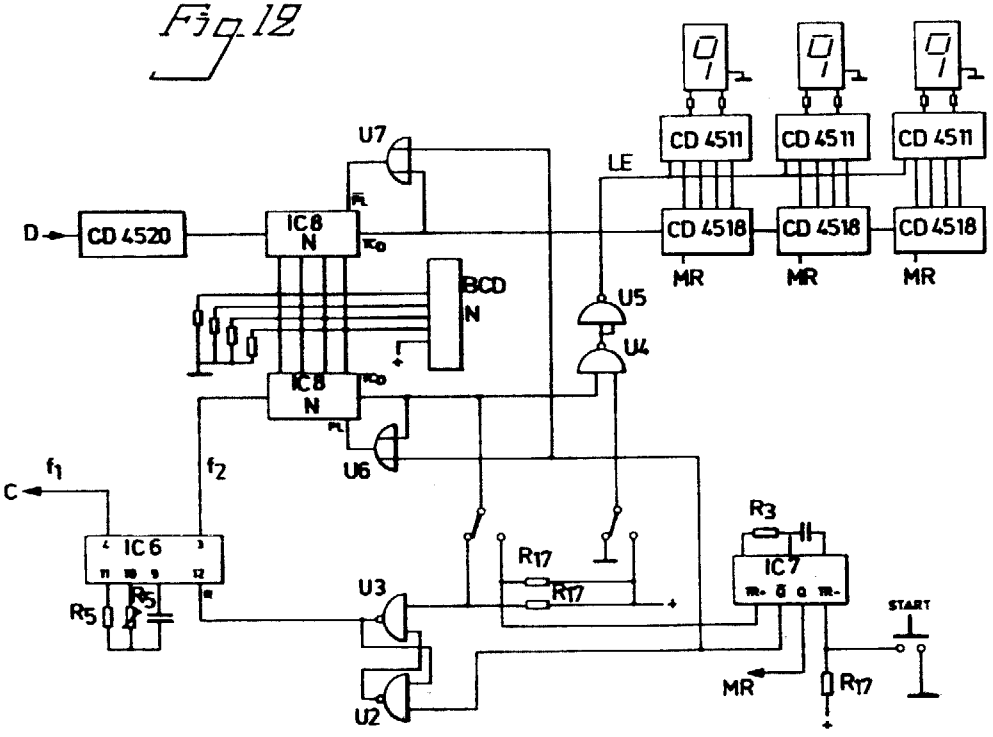
FIGS. 14–19 are diagrams illustrating the results achieved with an embodiment in accordance with FIG. 1.
Figure 17:
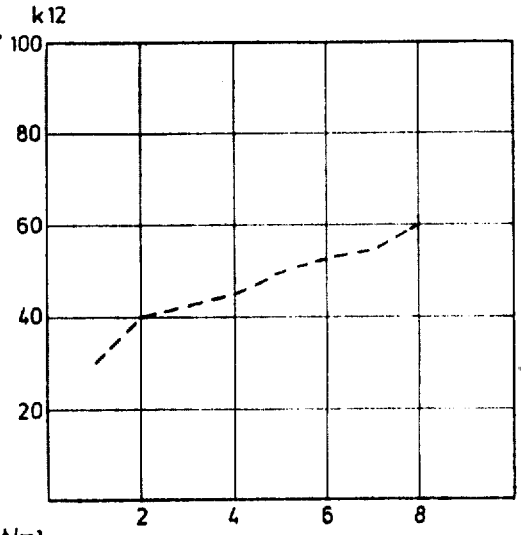
Figure 18:
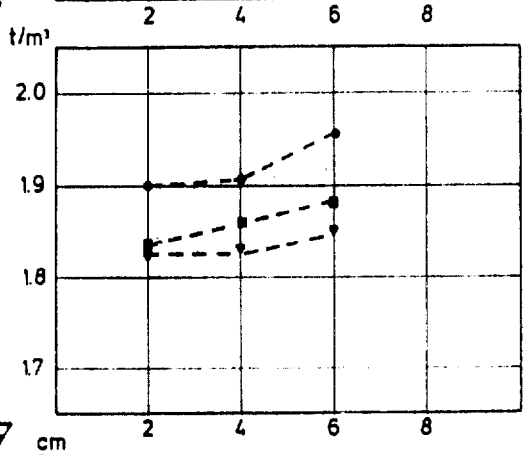
Figure 19:
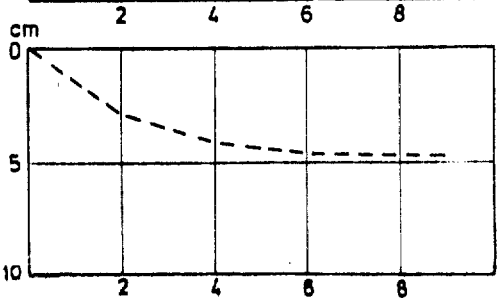

In FIGS. 17–19, the results achieved with tests performed in Biskopsberg 1975 on moraine with a vibratory tandem roller machine manufactured by Dynapac under the trade name CC 20 are shown. This roller had a fundamental frequency of about 50 Hz and the filters F10, F11 were tuned accordingly.

In FIG. 17, there is shown the relative magnitude of the quotient between the amplitude of the second harmonic and that of the fundamental as a function of the number of passages (1–8). The result has been derived by processing tape recordings of signals generated by a prototype with 50 Hz and 100 Hz filters.

In FIG. 18, the results from density measurements are shown. The density has been taken at three different levels (● = 1–15 cm; ■ = 15–30 cm; ▼ = 30–40 cm) after passages Nos. 2, 4 and 6, respectively with the aid of a water volume meter.

In FIG. 19, the settlement of the bed surface is shown as a function of the number of passages. The settlement has been determined by way of surface levelling.

The test results exhibit a good correlation between the settlement and the density of the bed and the relative magnitude of the quotient between the amplitudes in questions. The small deviations which are present can be attributed to imperfections of the prototype and margins of error during measurements etc. Accordingly, it is apparent that the previous mentioned relationship between the degree of compaction of a bed and the relative magnitude of the quotient really exists.

The above described embodiments may be varied and modified in several ways within the scope of the present invention. The number of harmonic components derived by filtering and having frequencies which generally correspond to different harmonics of the fundamental frequency need not necessarily be two. It is for example possible to use the amplitude of filtered harmonics having frequencies which correspond to the fourth harmonic of the fundamental. However, tests performed in this direction indicate that the amplitudes of the filtered fourth harmonics have generally the same order as those of noise and background signals. Tests indicate that it therefore, as a compromise between complexity on the one hand and price on the other, is preferred to make use of only such harmonic components which have a frequency corresponding to the second harmonic of the fundamental.

In embodiments generally corresponding to that of FIG. 3, it is moreover possible to derive, by filtering, a different number of harmonic components from different motion components signals, for example may two harmonic components with mutually different frequencies be filtered out from the motion component signal at the Z-outputs of the transducers in addition to only one harmonic component that is filtered out from the motion component signal derived at the X-outputs of the transducers.

For compacting devices having two or more vibrators with sufficiently spaced apart fundamental frequencies, it is possible to separate during the filtering each fundamental component and its accompanying harmonic components from the rest of the fundamental components and their accompanying harmonics. However, it is also possible to filter out and make use of the fundamental components in common and to filter out and make use of corresponding harmonics, which must be of the same order, in common. If two or more fundamental frequencies do not differ sufficiently nuch from each other, it may be practically impossible to separate them from each other, especially since they will exhibit a time dependent variation caused by the construction of the compaction device or by the achieved degree of compaction.

Provided that the amplitude of the fundamental component is constant, it would also be possible to filter out and make use of only one or more fundamental components. However, tests have indicated that the amplitude of the filtered fundamental components are not always constant. Moreover, the use of the quotient between the magnitude of two signals filtered out from one and the same transducer signal will simplify the calibration of the device for measuring the degree of compaction in accordance with the present invention.

Taking the quotient means that the influence of temperature, aging etc. of the transducers and of other components will be considerably reduced. The gain of the preamplifier may vary within reasonable limits without affecting the quotient. The use of filters which are of the same type and have the same relative band width for deriving the fundamental and harmonic components by filtering will, in combination with the forming of the quotient, provide a substantial reduction of the way in which reasonably small variations of the fundamental frequency of the vibratory motion will affect the result of the measurement. If the filters are detuned due to variations of the fundamental frequency, the amplitude of the filtered components will experience a relative decrease which is of substantially the same order of magnitude because the degree of detuning is the same. Accordingly, it is preferred to relate the magnitude of the amplitude of a filtered harmonic component to that of the filtered fundamental component.

It should be understood that the method and apparatus described herein may be modified as would occur to one of ordinary skill in the art without departing from the spirit and scope of the present invention.

It is claimed:

1. A method for measuring the degree of compaction achieved in a bed of material by a vibratory compaction device comprising the steps of:

vibrating the compaction device against the bed of material to be compacted to generate a characteristic signal of the vibratory motion of the compacting device against said material, said characteristic vibratory motion signal having a fundamental frequency and a plurality of harmonic frequencies;

measuring the amplitude of said characteristic vibratory motion signal at said fundamental frequency;

measuring the amplitude of said characteristic vibratory motion signal for at least the second harmonic of said fundamental frequency; and comparing the measured amplitudes of said fundamental frequency and said at least second harmonic frequency to ascertain the degree of compaction of said bed of material.

2. The method of claim 1, wherein said step of comparing comprises computing the quotient between the measured amplitude of said fundamental frequency and said second harmonic frequency.

3. The method of claim 1, comprising the further steps of:

measuring the amplitude of the third harmonic of said characteristic signal of said vibratory motion;

weighting and adding the measured amplitudes of the second and third harmonic frequencies to provide a weighted sum thereof; and comparing the weighted sum with the measured amplitude of the fundamental frequency to ascertain the degree of compaction of the bed of material.

4. The method of claim 3, wherein said characteristic signal of vibratory motion has both vertical and horizontal amplitude components with respect to said bed of material and only said vertical components are measured at said fundamental and harmonic frequencies.

5. The method of claim 3, wherein said characteristic signal of vibratory motion has both vertical and horizontal amplitude components and both said vertical and horizontal amplitude components at said fundamental and harmonic frequencies are measured for comparison.

6. A system for measuring the degree of compaction achieved in a bed of material by a vibratory compaction device comprising:

means for vibrating the compaction device against the bed of material to be compacted;

transducer means for generating a characteristic signal of the vibratory motion of the compacting device against said material, said characteristic vibratory motion signal having a fundamental frequency and a plurality of harmonic frequencies;

first filter means for filtering said fundamental frequency from said characteristic frequency to obtain a fundamental amplitude signal;

means for measuring the amplitude of said fundamental amplitude signal;

second filter means for filtering at least one harmonic frequency component from said characteristic signal to obtain a harmonic frequency signal;

means for measuring the amplitude of said harmonic frequency signal; and means for comparing the amplitudes of said fundamental and harmonic frequency signals to generate a signal representative of the degree of material compaction of said material.

7. The system of claim 6, wherein said means for comparing comprises divider means for determining the ratio between the amplitude of said fundamental frequency signal and the amplitude of said harmonic frequency signal.

8. The system of claim 6 further including:

third filter means for filtering an additional harmonic component of said characteristic signal to obtain an additional harmonic frequency signal;

means for measuring the amplitude of said additional harmonic frequency signal;

means for adding the respective measured amplitudes of harmonic signals; and means for comparing the amplitude of the fundamental signal to the sum of the amplitudes of the harmonic signals.

9. The system of claim 6 further including means for applying the signal from said means for comparing to said means for vibrating to control the degree of compaction.

*10. A method for measuring the degree of compaction achieved in a bed of material by a vibratory roller of a compaction device comprising steps of:*

*vibrating the vibratory roller of the compaction device such that said vibratory roller vibrates against the bed of material to be compacted to generate a characteris-*

*tic signal of the vibratory motion of the vibratory roller against said material, said characteristic vibratory motion signal having a fundamental frequency and a plurality of harmonic frequencies;*

*measuring the amplitude of said characteristic vibratory motion signal at said fundamental frequency;*

*measuring the amplitude of said characteristic vibratory motion signal for at least the second harmonic of said fundamental frequency; and*

*comparing the measured amplitudes of said fundamental frequency and said at least second harmonic frequency to ascertain the degree of compaction of said bed of material.*

*11. The method of claim 10, wherein said step of comparing comprises computing the quotient between the measured amplitude of said fundamental frequency and said second harmonic frequency.*

*12. The method of claim 10, comprising the further steps of:*

*measuring the amplitude of the third harmonic of said characteristic signal and said vibratory motion;*

*weighting and adding the measuring amplitudes of the second and third harmonic frequencies to provide a weighted sum thereof; and*

*comparing the weighted sum with the measured amplitude of the fundamental frequency to ascertain the degree compaction of the bed of material.*

*13. The method of claim 12, wherein said characteristic signal of vibratory motion has both vertical and horizontal amplitude components with respect to said bed of material and only said vertical components are measured at said fundamental and harmonic frequencies.*

*14. The method of claim 12, wherein said characteristic signal of vibratory motion has both vertical and horizontal amplitude components and both said vertical and horizontal amplitude components at said fundamental and harmonic frequencies are measured for comparison.*

*15. A system for measuring the degree of compaction achieved in a bed of material by a vibratory compaction device comprising:*

*roller means;*

*means for vibrating said roller means for compaction device against the bed of material to be compacted;*

*transducer means for generating a characteristic signal of the vibratory motion of said roller means of the compacting device against said material, said characteristic vibratory motion signal having a fundamental frequency and a plurality of harmonic frequencies;*

*first filter means for filtering said fundamental frequency from said characteristic frequency to obtain a fundamental amplitude signal;*

*means for measuring the amplitude of said fundamental amplitude signal;*

*second filter means for filtering at least one harmonic frequency component from said characteristic signal to obtain a harmonic frequency signal;*

*means for measuring the amplitude of said harmonic frequency signal; and*

*means for comparing the amplitudes of said fundamental and harmonic frequency signals to generate a signal representative of the degree of material compaction of said material.*

*16. The system of claim 15, wherein said means for comparing comprises divider means for determining the ratio between the amplitude of said fundamental frequency signal and the amplitude of said harmonic frequency signal.*

*17. The system of claim 15, further including:*

*third filter means for filtering an additional harmonic component of said characteristic signal to obtain an additional harmonic frequency signal;*

*means for measuring the amplitude of said additional harmonic frequency signal;*

*means for adding the respective measured amplitude of harmonic signals; and*

*means for comparing the amplitude of the fundamental signal to the sum of the amplitudes of the harmonic signals.*

*18. The system of claim 15, further including means for applying the signal from said means for comparing to said means for vibrating to control the degree of compaction.*

* * * * *